United States Patent
Kruglick (10) Patent No.: US 9,531,813 B2
(45) Date of Patent: Dec. 27, 2016

(54) SANDBOXED APPLICATION DATA REDIRECTION TO DATACENTERS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 258 days.

(21) Appl. No.: 14/380,372

(22) PCT Filed: Oct. 22, 2013

(86) PCT No.: PCT/US2013/066242
§ 371 (c)(1),
(2) Date: Aug. 21, 2014

(87) PCT Pub. No.: WO2015/060833
PCT Pub. Date: Apr. 30, 2015

(65) Prior Publication Data
US 2015/0358411 A1    Dec. 10, 2015

(51) Int. Cl.
*G06F 21/53* (2013.01)
*H04L 29/08* (2006.01)
(Continued)

(52) U.S. Cl.
CPC ............ *H04L 67/141* (2013.01); *G06F 21/51* (2013.01); *G06F 21/53* (2013.01); *G06F 21/62* (2013.01);
(Continued)

(58) Field of Classification Search
CPC ... H04L 67/141; H04L 63/0807; H04W 4/003; G06F 21/53; G06F 21/51; G06F 21/6218; G06F 21/62; G06F 9/5005; G06F 8/30; G06F 9/4856; G06F 9/4445; G06F 13/00
See application file for complete search history.

(56) References Cited

U.S. PATENT DOCUMENTS 8,839,266 B1 * 9/2014 Partridge ................ G06F 13/00
                                                                   719/310
2003/0154239 A1   8/2003 Davis et al.
(Continued)

FOREIGN PATENT DOCUMENTS

WO        2009111799 A2      9/2009

OTHER PUBLICATIONS

"AT&T Toggle?: A Complete Mobility Management Solution," accessed at http://web.archive.org/web/20131005021308/https://www.wireless.att.com/businesscenter/solutions/industry-solutions/mobile-productivity-solutions/toggle.jsp, accessed on Aug. 14, 2014, pp. 1-2.
(Continued)

*Primary Examiner* — Le Luu
(74) *Attorney, Agent, or Firm* — Turk IP Law, LLC (57) ABSTRACT

Technologies are generally described to redirect data from application sandboxes to datacenters. In some examples, an application operating in an application sandbox may exchange data with an application data store, such as a file or a directory, also located in the sandbox. The data store may then exchange data with a datacenter at a particular geographic locale over a network connection established by a sandbox data servicer module. The network connection may be periodically updated to connect the data store with different datacenters at different geographic locales based on geographic information associated with the application, a device on which the application executes, the datacenters, and/or the exchanged data.

20 Claims, 8 Drawing Sheets

(51) Int. Cl.
*G06F 21/62* (2013.01)
*G06F 21/51* (2013.01)
*H04W 4/00* (2009.01)

(52) U.S. Cl.
CPC ........... *G06F 21/6218* (2013.01); *H04L 67/18* (2013.01); *H04W 4/003* (2013.01)

(56) References Cited

U.S. PATENT DOCUMENTS

| | | | |
|---|---|---|---|
| 2007/0038994 | A1 | 2/2007 | Davis et al. |
| 2008/0276234 | A1 | 11/2008 | Taylor et al. |
| 2009/0276771 | A1* | 11/2009 | Nickolov ............... G06F 9/4856 717/177 |
| 2011/0231844 | A1 | 9/2011 | Ben-Shaul et al. |
| 2012/0036440 | A1* | 2/2012 | Dare ..................... G06F 9/4445 715/734 |
| 2013/0275470 | A1 | 10/2013 | Cao et al. |
| 2013/0275560 | A1 | 10/2013 | Bestmann et al. |
| 2013/0275591 | A1 | 10/2013 | Kruglick |
| 2014/0108792 | A1* | 4/2014 | Borzycki ............ G06F 21/6218 713/165 |
| 2014/0109175 | A1* | 4/2014 | Barton ................. H04L 63/0807 726/1 |
| 2014/0365999 | A1* | 12/2014 | Puz ......................... G06F 8/30 717/120 |
| 2015/0089497 | A1* | 3/2015 | Borzycki ................ G06F 21/53 718/1 |
| 2015/0278513 | A1* | 10/2015 | Krasin .................. G06F 9/5005 726/30 |

OTHER PUBLICATIONS

"iOS App Programming Guide," Developer, Apple Inc., pp. 153 (2013).
"Permissions," accessed at http://web.archive.org/web/20131017102530/http://developer.android.com/guide/topics/security/permissions.html, accessed on Aug. 14, 2014, pp. 1-7.
"Akamai Technologies Management Discusses Q4 2012 Results—Earnings Call Transcript," accessed at http://seekingalpha.com/article/1162521-akamai-technologies-management-discusses-q4-2012-results-earnings-call-transcript?part=single, posted on Feb. 6, 2013, pp. 1-30.
"App Sandbox Design Guide," Developer, Apple Inc., pp. 37 (2012).
"Easy, Powerful File Uploads," accessed at http://web.archive.org/web/20130910082337/https://www.inkfilepicker.com/, accessed on Aug. 13, 2014, pp. 1-3.
"One Stop Source for Federal Cloud Computing Information," accessed at http://web.archive.org/web/20130930000946/http://cloud.cio.gov/, accessed on Aug. 14, 2014, pp. 1-2.
"Track any data point in your app in real-time," accessed at http://web.archive.org/web/20131021062232/https://www.parse.com/, accessed on Aug. 14, 2014, pp. 1-3.
Anthony, S., "Windows 8 is shaping up to be the most secure desktop and mobile OS," accessed at http://web.archive.org/web/20131003120902/http://www.extremetech.com/computing/133658-windows-8-is-shaping-up-to-be-the-most-secure-desktop-and-mobile-os, posted on Jul. 30, 2012, pp. 1-3.
Corbett, J. C., et al., "Spanner: Google's Globally-Distributed Database," Published in the Proceedings of OSDI 2012, pp. 1-14 (2012).
Goyal, S. K., and Singh, M., "Enhanced Genetic Algorithm Based Load Balancing in Grid," IJCSI International Journal of Computer Science Issues, vol. 9, No. 3, pp. 260-266 (May 2012).
Harris, D., "Nodeable gives Hadoop a real-time boost with StreamReduce," posted on Jul. 18, 2012, accessed at http://web.archive.org/web/20130823042431/http://gigaom.com/2012/07/18/nodeable-gives-hadoop-a-real-time-boost-with-streamreduce/, accessed on Aug. 14, 2014, pp. 5.
International search report and written opinion for PCT Application No. PCT/US2013/066242 mailed on Apr. 29, 2014.
Karimi, H. A., and Roongpiboonsopit, D., "Are Clouds Ready for Geoprocessing?," In Cloud Computing and Services Science, edited by Ivanov, I., Sinderen, M. v., and Shishkov, B., pp. 295-312 (2012).
Nebert, D., "Deploying Federal Geospatial Services in the Cloud," Federal Geographic Data Committee (FGDC) and GSA GeoCloud Sandbox Initiative, pp. 1-14 (2010).
Nebert, D., "Geospatial Platform: Technical Architecture and Standards," U.S. Federal Geographic Data Committee Secretariat, White Paper, pp. 1-7 (2012).
Soulskill, "DARPA Open Source Security Helped FreeBSD, Junos, Mac OS X, iOS," accessed at http://web.archive.org/web/20130203004721/http://tech.slashdot.org/story/13/01/30/225253/darpa-open-source-security-helped-freebsd-junos-mac-os-x-ios, posted on Jan. 30, 2013, pp. 1-6.
Taylor, C., "Parse Shows Off Anypic, The Open Source Instagram Clone That Took 30 Minutes To Build," accessed http://web.archive.org/web/20131013144728/http://techcrunch.com/2012/07/26/parse-shows-off-anypic-the-open-source-instagram-clone-that-took-30-minutes-to-build/, posted on Jul. 26, 2012, pp. 1-2.
Watson, R.N.M., "DARPA and sandboxing," University of Cambridge, accessed at http://web.archive.org/web/20131001113908/http://www.cl.cam.ac.uk/~rnw24/, accessed on Aug. 14, 2015, pp. 1-3.

\* cited by examiner

SANDBOXED APPLICATION DATA REDIRECTION TO DATACENTERS

CROSS-REFERENCE TO RELATED APPLICATION

This Application is the National Stage filing under 35 US.C. §371 of PCT Application Ser. No. PCT/US13/66242 filed on Oct. 22, 2013. The PCT application is hereby incorporated by reference in its entirety.

BACKGROUND

Unless otherwise indicated herein, the materials described in this section are not prior art to the claims in this application and are not admitted to be prior art by inclusion in this section.

The placement and management of geospatial data, or data associated with specific geographic locations, has come into focus as use of mobile devices and cloud services become more widespread. Geospatial data may be available from numerous sources, in many diverse and heterogeneous formats and structures, and may be compiled using various geospatial data collection techniques. As such, it may be desirable to assure that the various sources of potential geospatial data, such as user applications, interact with the geographically-appropriate datacenters.

Geospatial data processing and management, although fairly complicated, may be reasonably implemented by large companies with their commensurate resources. However, user application developers are becoming smaller as application development becomes easier and simpler. Such smaller developers may lack the resources larger companies do, and may find it difficult to take advantage of geospatial data processing.

SUMMARY

The present disclosure generally describes techniques to redirect data from application sandboxes to datacenters.

According to some examples, methods are provided to redirect data from an application sandbox to datacenters. An example method may include executing an application in an application sandbox at a first device and establishing a network connection between a sandboxed data store in the application sandbox and a first datacenter at a first geographic location. The method may further include exchanging a first data between the application and the sandboxed data store and exchanging the first data between the sandboxed data store and the first datacenter via the network connection.

According to other examples, devices are provided to redirect data from an application sandbox to datacenters. An example device may include a memory, a sandboxing module configured to provide an application sandbox and a sandboxed data store in the memory, and a processing module. The processing module may be configured to execute an application in the application sandbox and establish a network connection between the sandboxed data store and a first datacenter at a first geographic location. The processing module may be further configured to exchange a first data between the application and the sandboxed data store and exchange the first data between the sandboxed data store and the first datacenter via the network connection.

According to further examples, methods are provided for geo-spatial load balancing and data management across datacenters. An example method may include receiving application information associated with an application being executed in a device sandbox, determining, based on the application information and geospatial information associated with multiple datacenters, a destination datacenter selected from the multiple datacenters, and updating the application based on the destination datacenter.

According to yet further examples, a geo-manager module is provided to redirect data from application sandboxes to datacenters. The geo-manager module may include a memory configured to store geospatial information associated with multiple datacenters and a processing module. The processing module may be configured to receive application information associated with an application being executed in a device sandbox, determine, based on the application information and the geospatial information, a destination datacenter selected from the multiple datacenters, and provide an update for the application based on the destination datacenter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to redirection of data from application sandboxes to datacenters.

Briefly stated, technologies are generally described to redirect data from application sandboxes to datacenters. In some examples, an application operating in an application sandbox may exchange data with an application data store, such as a file or a directory, also located in the sandbox. The data store may then exchange data with a datacenter at a particular geographic locale over a network connection established by a sandbox data servicer module. The network connection may be periodically updated to connect the data store with different datacenters at different geographic locales based on geographic information associated with the application, a device on which the application executes, the datacenters, and/or the exchanged data.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users.

Figure 1:
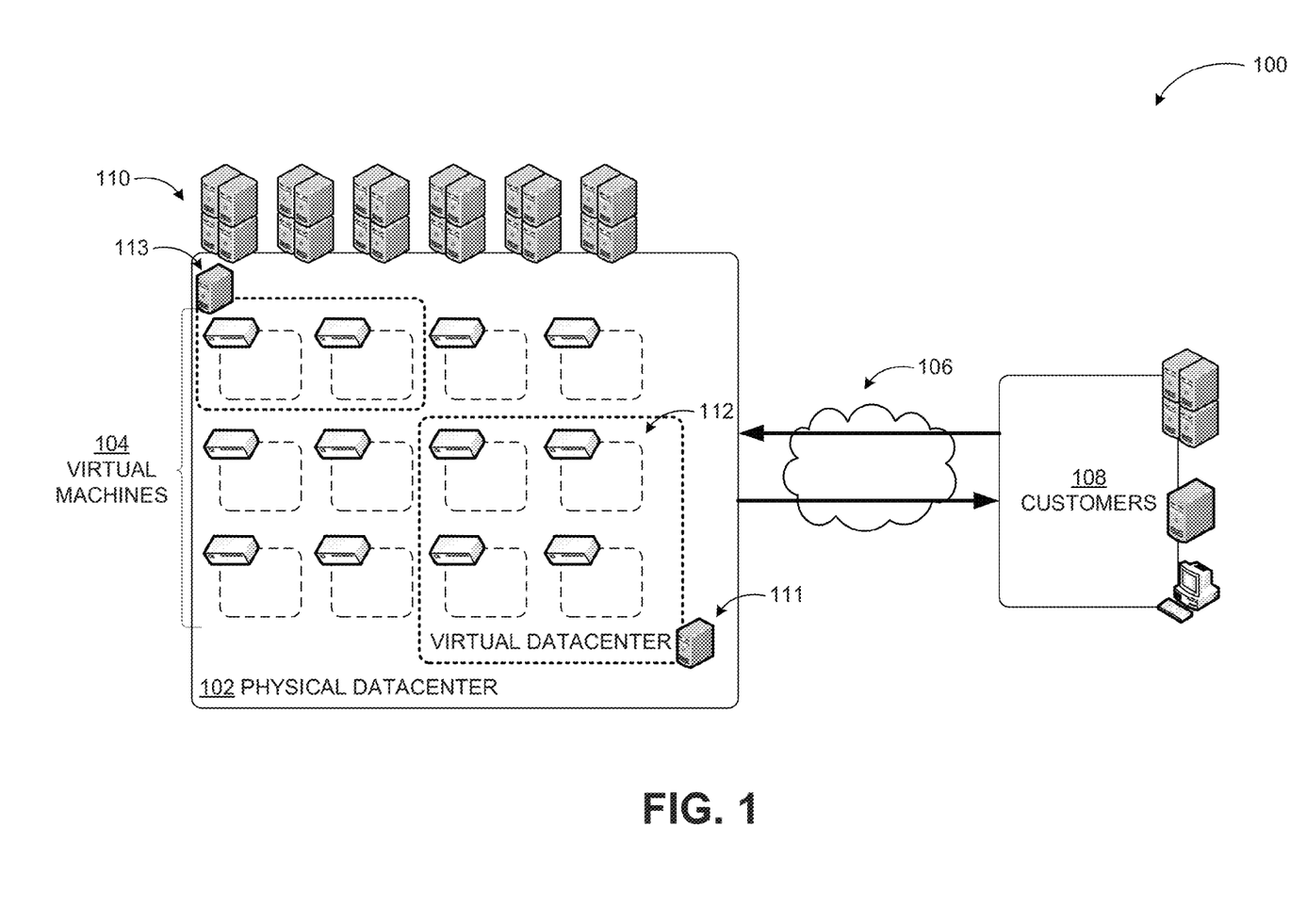
FIG. 1 illustrates an example datacenter-based system where data redirection from sandboxed applications may be implemented.

FIG. 1 illustrates an example datacenter-based system where data redirection from sandboxed applications may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

As described above, many application developers may lack the resources to take advantage of geospatial data processing. To address this issue, entities that have the resources to perform geospatial data processing, such as the large companies mentioned above, may provide geospatial data interfaces configured to couple to individual applications. Sandboxed data files or directories associated with individual applications may then serve as data "pipes" for transferring data between the individual applications and various datacenters through these geospatial data interfaces. As a result, application developers who wish to build applications that take advantage of geospatial data processing may not need to deal with the complexities involved in geospatial data management. Instead, application developers may rely on the expertise of larger geospatial data service providers. Moreover, since sandboxing can be implemented at the operating system level instead of the application level, any given application may be provided with geospatial data processing capability simply by executing the application on a device with an operating system that supports sandboxing. Even older or legacy software applications not originally designed for network-based interactions may be provided with geospatial data processing simply by executing them on a platform that provides sandboxing.

Figure 2:
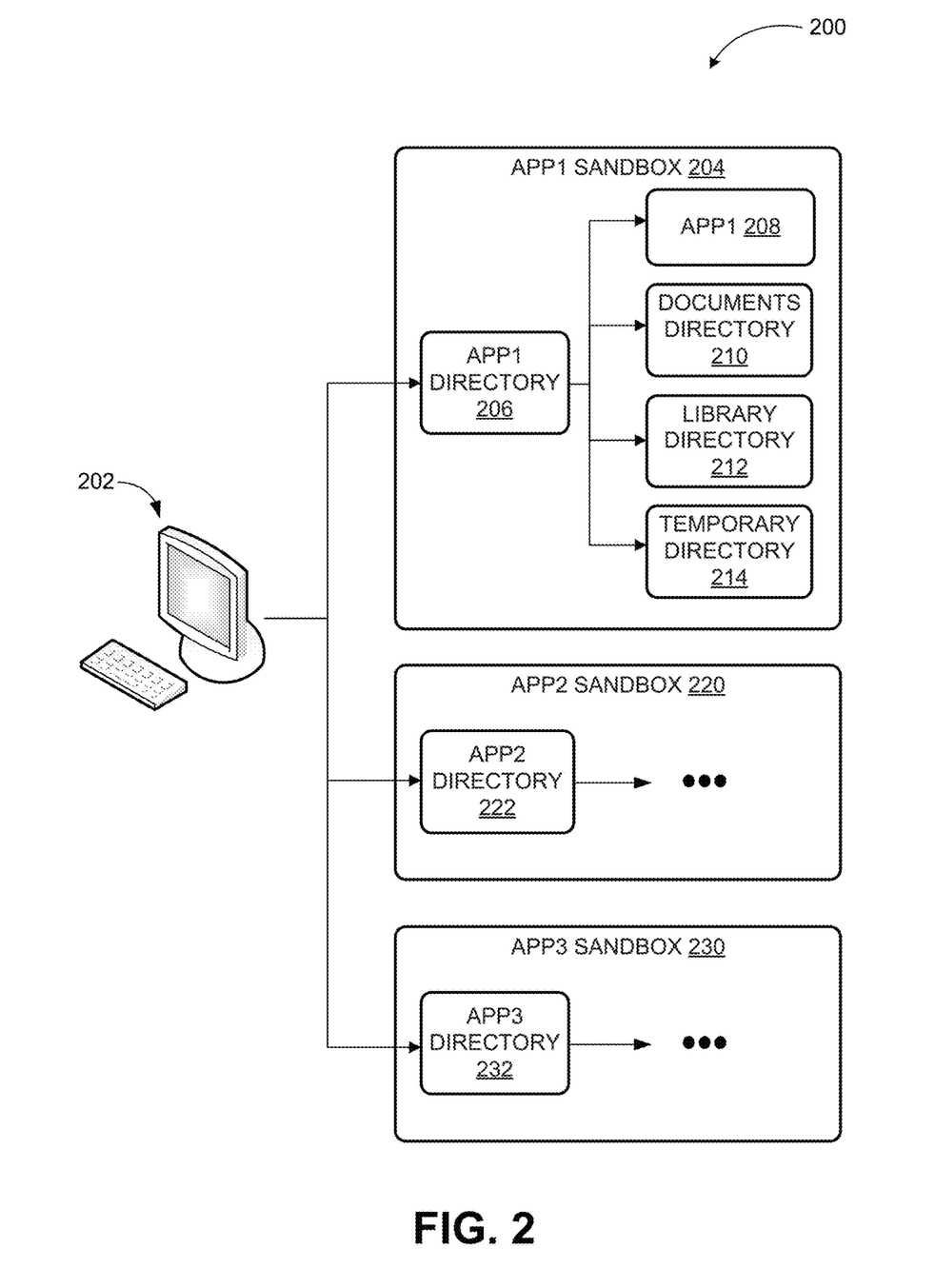
FIG. 2 illustrates an example device where application sandboxing may be implemented.

FIG. 2 illustrates an example device where application sandboxing may be implemented, arranged in accordance with at least some embodiments described herein.

According to a diagram 200, a computing device 202, such as a desktop or mobile computer, a tablet computer, a smartphone, or any other suitable computing device, may execute a number of different applications. In some embodiments, the computing device 202 may execute an individual application in an application sandbox. As used herein, an application sandbox may refer to a set of controls that determines what a particular application can do in a system, and may be implemented at the operating system level or the application level. For example, the operating system of the computing device 202 may implement an application sandbox to limit an application's access to files, preferences, network resources, and/or hardware at the computing device 202. In the diagram 200, the computing device 202 may execute a first application 208 in a first application sandbox 204, a second application in a second application sandbox 220, and a third application in a third application sandbox 230. Each of the application sandboxes 204, 220, and 230 may include the associated application as well as any files or memory locations that the associated application can access. For example, the first application sandbox 204 may include a first application directory 206 that contains the first application 208 as well as a documents directory 210, a library directory 212, and a temporary directory 214. In other examples, some or all of these elements may be kept separate, for example, the operating system may keep executable application 208 outside sandbox 204 to prevent the application changing its executable code.

In some embodiments, application sandboxing may allow each application on a computing device to see the same file structure, but actually have each application interact with different, sandboxed versions of the various directories or data files. For example, both the first application 208 in the first application sandbox 204 and the second application in the second application sandbox 220 may have access to a "documents" directory. However, the first application 208 may write to and read from its own version of the "documents" directory (the documents directory 210) and the second application may access its own, different version of the "documents" directory, located in the second application sandbox 220. The different versions of the directories may in fact be virtual data stores in system memory or storage managed by the operating system of the computing device 202. As a result, any given sandboxed application may only modify data and settings within its own sandbox, and may not modify data and settings belonging to other applications on the computing device 202.

Figure 3:
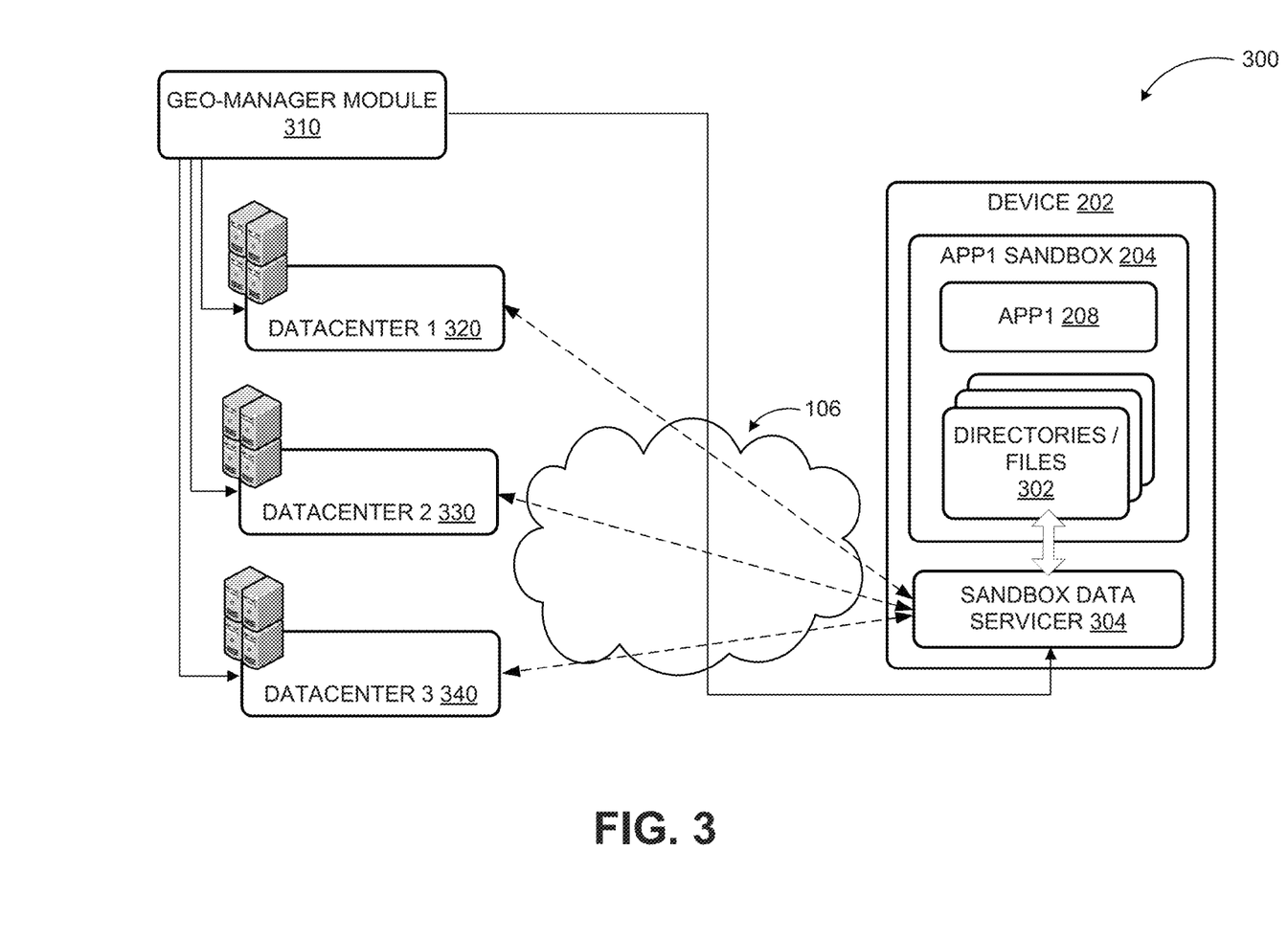
FIG. 3 illustrates an example system where data from application sandboxes may be redirected to datacenters.

FIG. 3 illustrates an example system where data from application sandboxes may be redirected to datacenters, arranged in accordance with at least some embodiments described herein.

As shown in a diagram 300, the computing device 202 may execute the first application 208 in the first application sandbox 204. During execution, the first application 208 may have read/write access to one or more sandbox directories or data files 302. For example, the directories/files 302 may include the documents directory 210, the library directory 212, the temporary directory 214, and/or any other suitable directories or files. Since the directories/files 302 are sandbox directories/files, the device 202 may treat the directories/files 302 as virtual data stores, and may isolate data written to the directories/files 302 by the first application 208 from other directories or files at the device 202.

As mentioned above, sandboxed directories or data files associated with a sandboxed application may serve as data "pipes" coupling the sandboxed application to various datacenters for geospatial data processing and management. In some embodiments, a geo-manager module 310 may provide geospatial data management for the device 202. The geo-manager module 310 may manage multiple datacenters, such as a first datacenter 320, a second datacenter 330, and/or a third datacenter 340, each located in a different geographic locale. In some embodiments, the geo-manager module 310 may be located or implemented at one of the datacenters or at an entirely separate location. As part of the geospatial data management process, the geo-manager module 310 may determine a suitable destination datacenter for geospatial data from the device 202 or the first application 208 based on one or more parameters. For example, the geo-manager module 310 may select one of the datacenters 320, 330, or 340 as a destination datacenter for the device 202 or the first application 208 based on the geographic location of the device 202, the first application 208, and/or the datacenters 320, 330, or 340. In some embodiments, the geo-manager module 310 may select the destination datacenter based on a type or contents of the geospatial data to be transferred.

To establish the actual connection between the destination datacenter and the device 202 and/or first application 208, the geo-manager module 310 may communicate with a sandbox data servicer 304 being executed at the device 202. For example, the geo-manager module 310 may provide information about the destination datacenter to the sandbox data servicer 304. The destination datacenter information may be provided in the form of an application programming interface (API) message, a JavaScript Object Notation (JSON) object, an Extensible Markup Language (XML) object, and/or any other suitable message or object. The sandbox data servicer 304 may then establish network connections for data exchange between the sandbox directories/files 302 and the datacenters 320, 330, and 340. For example, the sandbox data servicer 304 may be configured to establish connections between the directories/files 302 and one or more of the datacenters 320, 330, and 340 via a network, represented by the cloud 106. Subsequently, all or some data written to the sandbox directories/files 302 by the first application 208 may be transferred, via the established network connections, to the appropriate destination datacenter, where geospatial data processing and management may occur. Data may also be written to the sandbox directories/files 302 by the destination datacenter via the network connections for the first application 208 to read. This may allow application developers to take advantage of geospatial data processing and management provided by other entities merely by implementing or using application sandboxes. In some embodiments, the data transferred over the network connections in either or both directions may be encrypted or otherwise secured to provide additional security.

As described above, the sandbox data servicer 304 may establish a network connection between a destination datacenter and the sandbox directories/files associated with one application on the device 202, and different applications may be connected to different datacenters. In some embodiments, sandbox directories/files associated with multiple applications may be connected to the same destination datacenter. In other embodiments, one sandbox directory/file associated with an application may be connected to one destination datacenter, while another sandbox directory/file associated with the same application may be connected to another destination datacenter. Some sandboxed directories/files may not be connected to any datacenters, and may remain isolated. For example, the sandboxed directories/files associated with a particular application executing on the device 202 may not be connected to any datacenters. In some embodiments, some sandboxed directories/files associated with an application may be connected to datacenters, and other sandboxed directories/files associated with the same application may be isolated from all datacenters.

In some embodiments, a geo-manager module 310 operating in conjunction with the sandbox data servicer 304 may periodically update the network connections between the sandboxed directories/files 302 and the various datacenters. The network connections may be updated if one or more parameters associated with the device 202, the applications executing on the device 202, the data being exchanged over the network connection, the cloud 106, and/or the datacenters 320, 330, and 340 change. For example, network connections may be updated when the device 202 moves to a different geographic location, when the device 202 begins or halts execution of one or more applications, when the type, format, or content of data being exchanged changes, and/or when datacenters come online or go offline. The geo-manager module 310 may update the network connections by providing updated destination datacenter information to the sandbox data servicer 304 in the form of an API message, a JSON/XML, object, or in any other suitable format. Subsequently, the sandbox data servicer 304 may update network connections from the sandboxed directories/files 302 to reflect the updated destination datacenter information. For example, in response to receiving updated destination datacenter information indicating the second datacenter 330 as the new destination, the sandbox data servicer 304 may change a network connection ending at the first datacenter 320 to end at the second datacenter 330.

In some embodiments, ongoing communication between the sandboxed directories/files 302 and the original destination datacenter may be maintained during a switch to the updated destination datacenter. For example, the sandboxed directories/files 302 may initially communicate with the first datacenter 320 in a first session. As the network connection is updated to end at the second datacenter 330 instead of the first datacenter 320, the sandbox data servicer 304 may maintain the same first session such that the datacenter switch is transparent to the sandboxed directories/files 302. In some embodiments, the geo-manager module 310 may assist in maintaining the first session by sending keys or session information when providing network connection updates.

Figure 4:
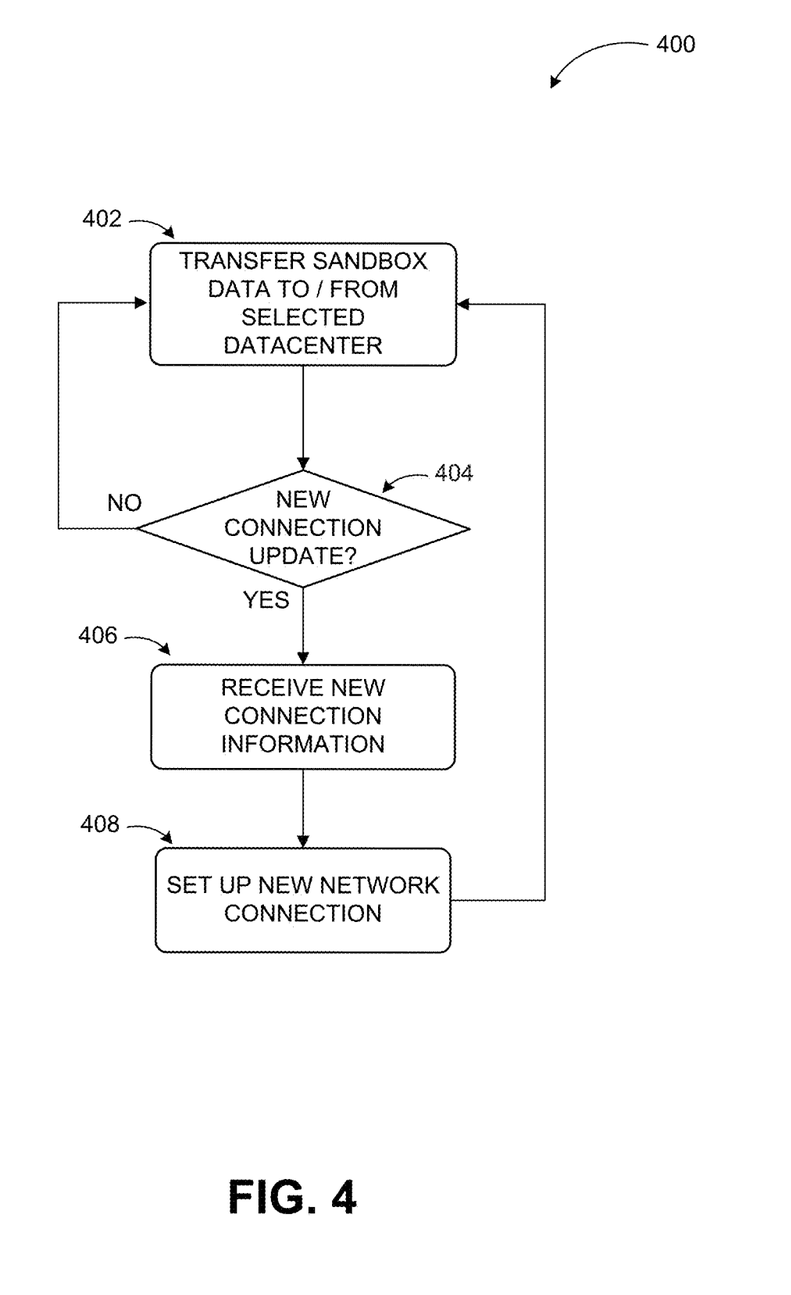
FIG. 4 illustrates an example process for a device to update network connections for data redirection from application sandboxes to datacenters.

FIG. 4 illustrates an example process 400 for a device to update network connections for data redirection from application sandboxes to datacenters, arranged in accordance with at least some embodiments described herein.

The process 400 may begin at an operation 402 (TRANSFER SANDBOX DATA TO/FROM SELECTED DATACENTER), where a sandbox data servicer module (e.g., the sandbox data servicer 304) may transfer data between a sandboxed data store (e.g., the sandboxed directories/files 302) and a selected destination datacenter. At a next operation 404 (NEW CONNECTION UPDATE?), a sandbox data servicer module (e.g., the sandbox data servicer 304) may determine whether a new connection update has been received. For example, the sandbox data servicer module may receive new connection updates from a geo-manager module (e.g., the geo-manager module 310) based on parameter changes associated with the application, device, and/or datacenters. In response to determining that no new connection updates have been received, the sandbox data servicer module may return to the operation 402 and continue transferring data between the sandboxed data store and the selected destination datacenter.

On the other hand, in response to determining that a new connection update has been received, at a next operation 406 (RECEIVE NEW CONNECTION INFORMATION), the sandbox data servicer module may receive the new connection information, for example, in the form of an API message, a JSON/XML object, or any other suitable message or object. At a next operation 408 (SET UP NEW NETWORK CONNECTION), the sandbox data servicer module may set up the new network connection based on the received new connection information. For example, the sandbox data servicer module may update a network connection to end at a new destination datacenter. Subsequently, the sandbox data servicer module may return to the operation 402 and continue transferring data between the sandboxed data store and the newly-updated destination datacenter.

Figure 5:
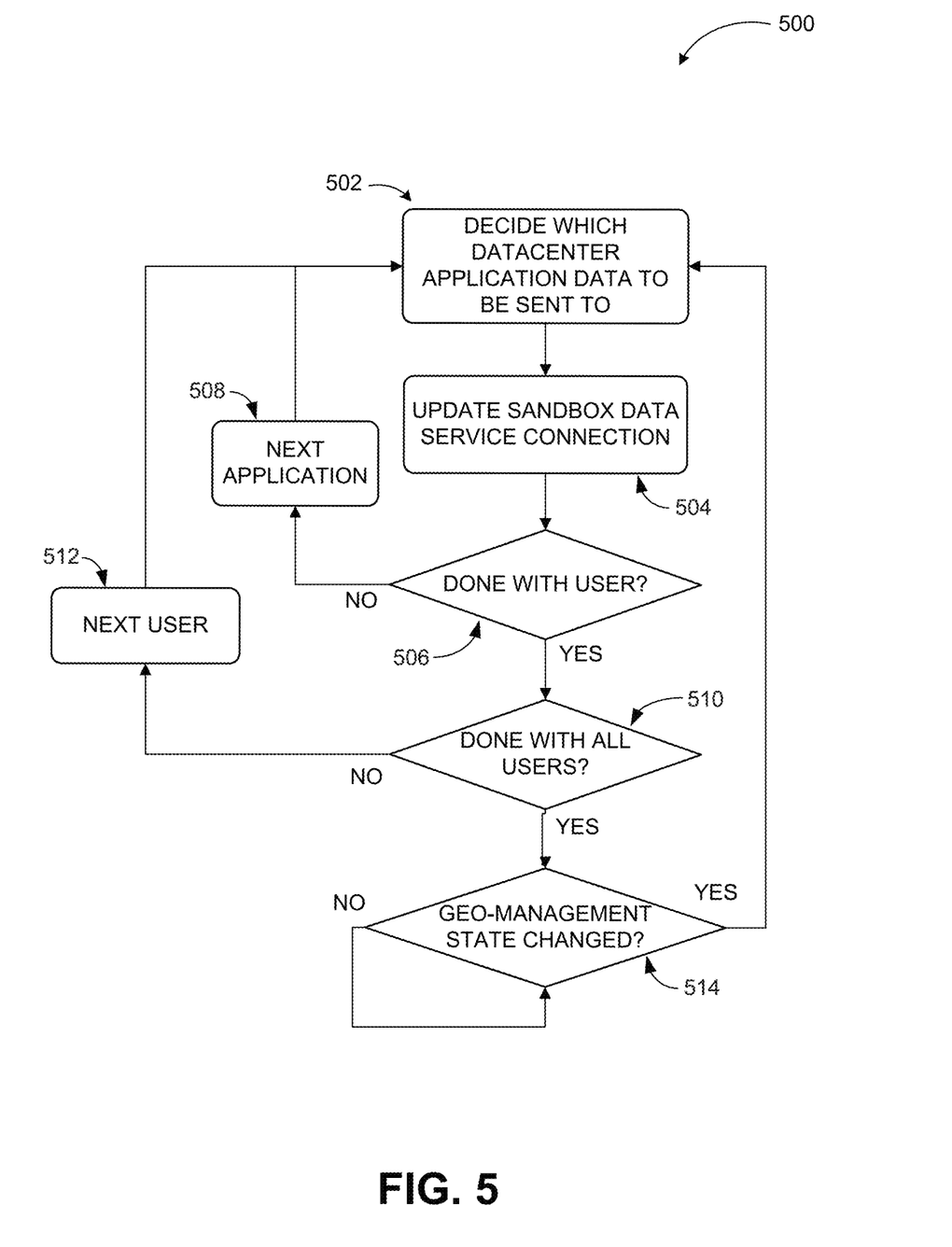
FIG. 5 illustrates an example process for a geo-manager module to update network connections for application sandbox data redirection from multiple users and multiple applications to datacenters.

FIG. 5 illustrates an example process 500 for a geo-manager module to update network connections for application sandbox data redirection from multiple users and multiple applications to datacenters, arranged in accordance with at least some embodiments described herein.

The process 500 may begin at an operation 502 (DECIDE WHICH DATACENTER APPLICATION DATA TO BE SENT TO), where a geo-manager module (e.g., the geo-manager 310) may decide which datacenter data from a particular application associated with a particular user should be sent to. The geo-manager module may perform the decision based on one or more parameters associated with the application, the user, the data, and/or the datacenters, such as geographic location, data type/format/content, time, network traffic, datacenter status, and/or any other suitable parameters. Subsequently, at an operation 504 (UPDATE SANDBOX DATA SERVICE CONNECTION) the geo-manager module may update the sandbox data service connection. For example, the geo-manager module may provide a network connection update with new destination datacenter information to a sandbox data servicer module (e.g., the sandbox data servicer 304) at the device executing the application.

At a next operation 506 (DONE WITH USER?), the geo-manager module may determine whether the user has any other applications to update. In response to determining that the user has at least one other application to update, at an operation 508 (NEXT APPLICATION) the geo-manager module may switch to the next, un-updated application, then again iterate through the operations 502-504. In response to determining that the user does not have any other application to update, at an operation 510 (DONE WITH ALL USERS?) the geo-manager module may determine if any other users have applications to update. In response to determining that there is at least one other user with applications to update, at an operation 512 (NEXT USER) the geo-manager may switch to the next user with un-updated applications, then again iterate through the operations 502-506. On the other hand, in response to determining that no other users have applications to update, at an operation 514 (GEO-MANAGEMENT STATE CHANGED?) the geo-manager module may determine if geo-management state has been changed. For example, geo-management state may change in response to users leaving or joining, new applications starting, users moving, running applications stopping, network load-balancing changes, geospatial data processing changes, or any other change in the geo-manager module operating environment. In response to determining that geo-management state has changed, the geo-manager module may again iterate through the operations 502-510. On the other hand, in response to determining that geo-management state has not changed, the geo-manager module may again check if geo-management state has changed at a later time.

Figure 6:
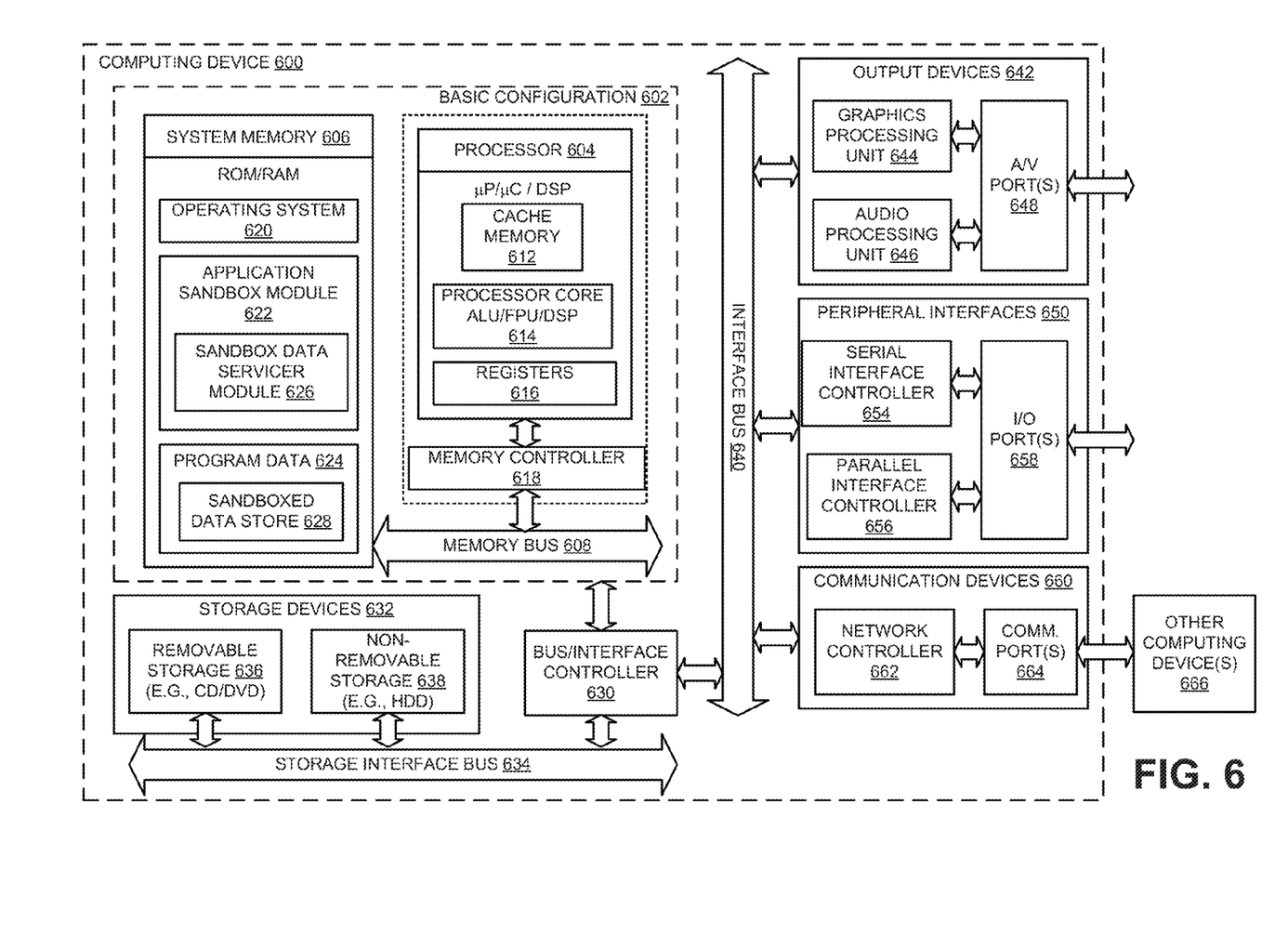
FIG. 6 illustrates a general purpose computing device, which may be used to redirect data from application sandboxes to datacenters.

FIG. 6 illustrates a general purpose computing device, which may be used to redirect data from application sandboxes to datacenters, arranged in accordance with at least some embodiments described herein.

For example, the computing device 600 may be used to redirect data from application sandboxes to datacenters as described herein. In an example basic configuration 602, the computing device 600 may include one or more processors 604 and a system memory 606. A memory bus 608 may be used to communicate between the processor 604 and the system memory 606. The basic configuration 602 is illustrated in FIG. 6 by those components within the inner dashed line.

Depending on the desired configuration, the processor 604 may be of any type, including but not limited to a microprocessor ($\mu$P), a microcontroller ($\mu$C), a digital signal processor (DSP), or any combination thereof. The processor 604 may include one more levels of caching, such as a cache memory 612, a processor core 614, and registers 616. The example processor core 614 may include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, an application sandbox module 622, and program data 624. The application sandbox module 622 may include a sandbox data servicer module 626 to implement network connections between application sandboxes and datacenters as described herein. The program data 624 may include, among other data, a sandboxed data store 628 or the like, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., one or more output devices 642, one or more peripheral interfaces 650, and one or more communication devices 660) to the basic configuration 602 via the bus/interface controller 630. Some of the example output devices 642 include a graphics processing unit 644 and an audio processing unit 646, which may be configured to communicate to various external devices such as a display or speakers via one or more A/V ports 648. One or more example peripheral interfaces 650 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 660 includes a network controller 662, which may be arranged to facilitate communications with one or more other computing devices 666 over a network communication link via one or more communication ports 664. The one or more other computing devices 666 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Figure 7:
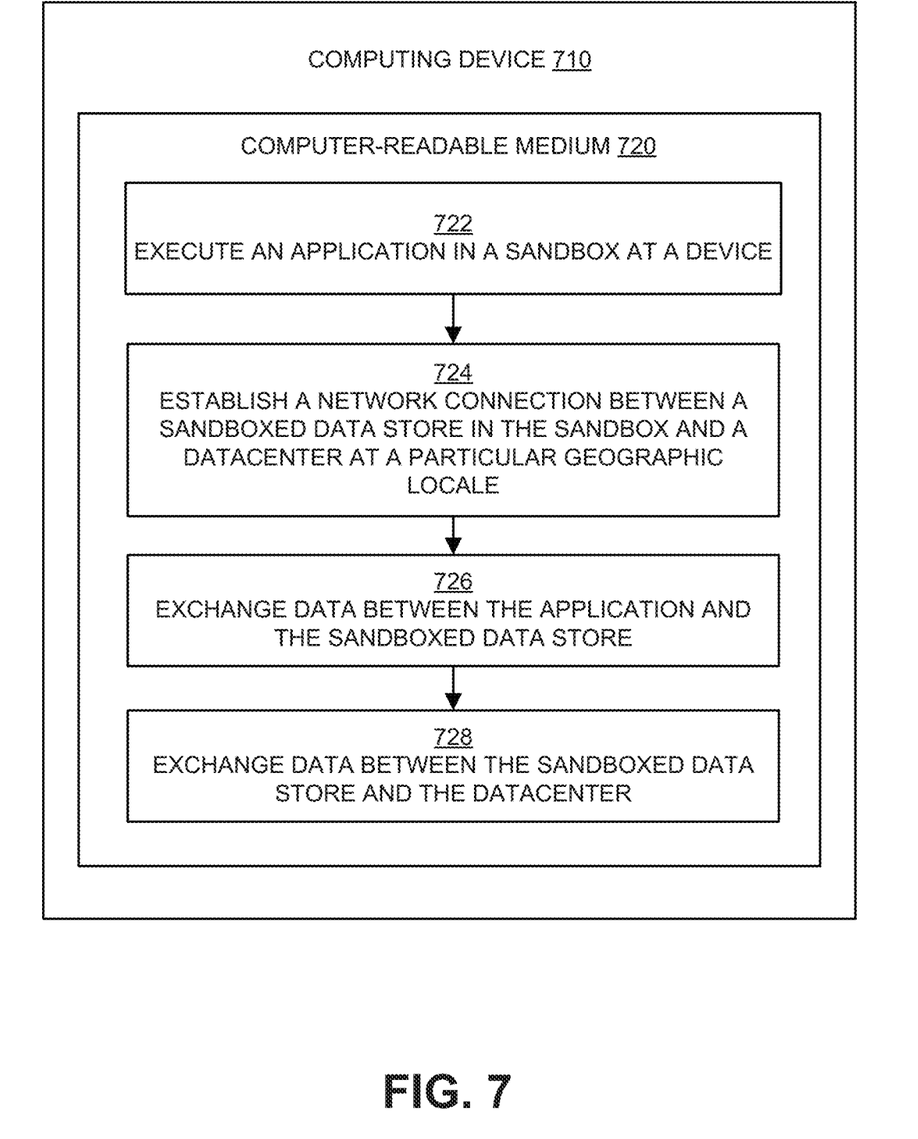
FIG. 7 is a flow diagram illustrating an example method to redirect data from application sandboxes that may be performed by a computing device such as the computing device in FIG. 6.

FIG. 7 is a flow diagram illustrating an example method to redirect data from application sandboxes that may be performed by a computing device such as the computing device in FIG. 6, arranged in accordance with at least some embodiments described herein.

Example methods may include one or more operations, functions or actions as illustrated by one or more of blocks 722, 724, 726, and/or 728, and may in some embodiments be performed by a computing device such as the computing device 600 in FIG. 6. The operations described in the blocks 722-728 may also be stored as computer-executable instructions in a computer-readable medium such as a computer-readable medium 720 of a computing device 710.

An example process to redirect data from application sandboxes to datacenters may begin with block 722, "EXECUTE AN APPLICATION IN A SANDBOX AT A DEVICE", where an application (e.g., the first application 208) may be executed in an application sandbox (e.g., the first application sandbox 204) at a device (e.g., the computing device 202).

Block 722 may be followed by block 724, "ESTABLISH A NETWORK CONNECTION BETWEEN A SANDBOXED DATA STORE IN THE SANDBOX AND A DATACENTER AT A PARTICULAR GEOGRAPHIC LOCALE", where a network connection may be established between a sandboxed data store (e.g., the sandboxed directories/files 302) and a datacenter at a particular geographic locale, as described above. The network connection may be established by a geo-manager module (e.g., the geo-manager module 310) operated in conjunction with a sandbox data servicer module (e.g., the sandbox data servicer 304). For example, the sandbox data servicer module may receive information from the geo-manager module about a destination datacenter. The sandbox data servicer module may then set up a network connection between the sandboxed data store and the destination datacenter using the received information.

Block 724 may be followed by block 726, "EXCHANGE DATA BETWEEN THE APPLICATION AND THE SANDBOXED DATA STORE", where the application may read data from or write data to the sandboxed data store, as described above.

Finally, block 726 may be followed by block 728, "EXCHANGE DATA BETWEEN THE SANDBOXED DATA STORE AND THE DATACENTER", where the sandbox data servicer module may exchange data between the sandboxed data store and the destination datacenter via the established network connection, as described above.

Figure 8:
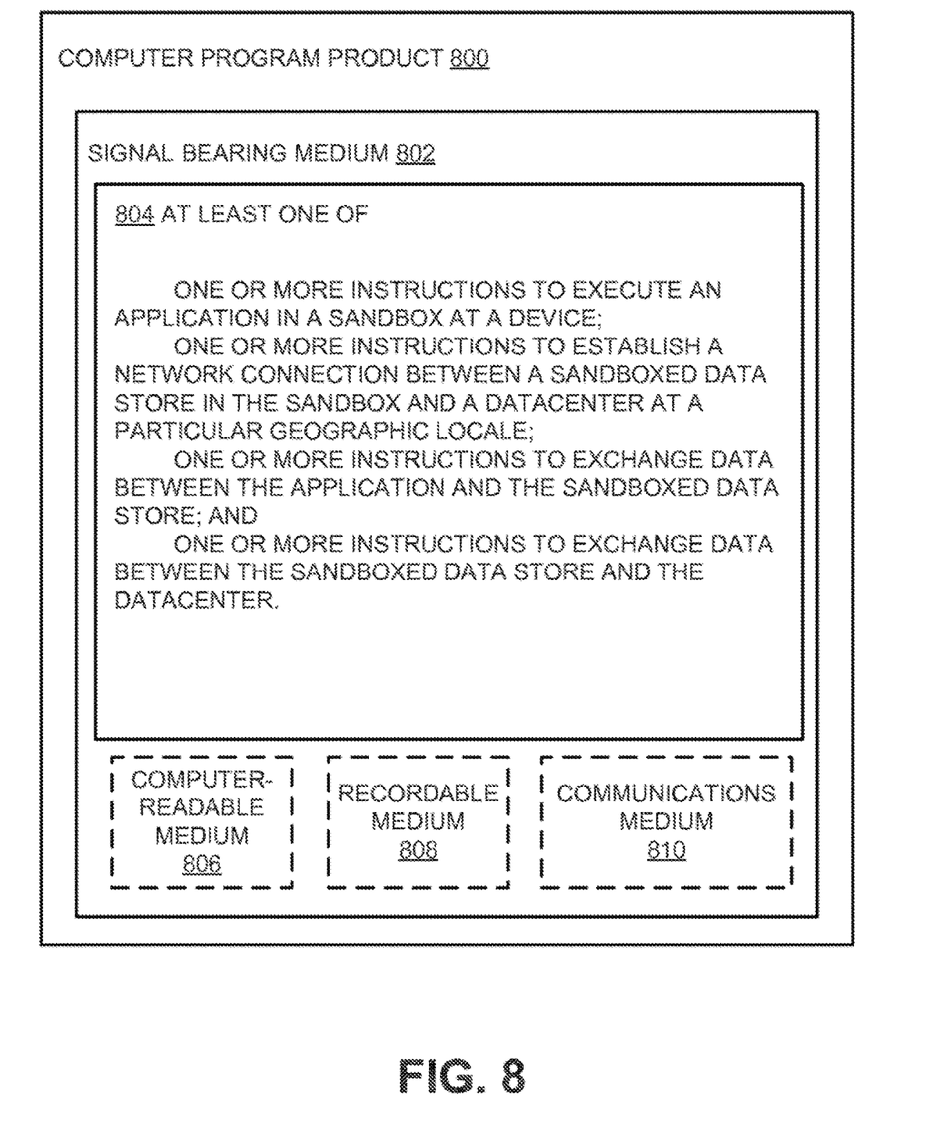
FIG. 8 illustrates a block diagram of an example computer program product, all arranged in accordance with at least some embodiments described herein.

FIG. 8 illustrates a block diagram of an example computer program product, arranged in accordance with at least some embodiments described herein.

In some examples, as shown in FIG. 8, a computer program product 800 may include a signal bearing medium 802 that may also include one or more machine readable instructions 804 that, when executed by, for example, a processor may provide the functionality described herein. Thus, for example, referring to the processor 604 in FIG. 6, the application sandbox module 622 may undertake one or more of the tasks shown in FIG. 8 in response to the instructions 804 conveyed to the processor 604 by the signal bearing medium 802 to perform actions associated with redirecting data from application sandboxes as described herein. Some of those instructions may include, for example, to execute an application in a sandbox at a device, to establish a network connection between a sandboxed data store in the sandbox and a datacenter at a particular geographic locale, to exchange data between the application and the sandboxed data store, and/or to exchange data between the sandboxed data store and the datacenter, according to some embodiments described herein.

In some implementations, the signal bearing media 802 depicted in FIG. 8 may encompass computer-readable media 806, such as, but not limited to, a hard disk drive, a solid state drive, a Compact Disc (CD), a Digital Versatile Disk (DVD), a digital tape, memory, etc. In some implementations, the signal bearing media 802 may encompass recordable media 808, such as, but not limited to, memory, read/write (R/W) CDs, R/W DVDs, etc. In some implementations, the signal bearing media 802 may encompass communications media 810, such as, but not limited to, a digital and/or an analog communication medium (e.g., a fiber optic cable, a waveguide, a wired communications link, a wireless communication link, etc.). Thus, for example, the computer program product 800 may be conveyed to one or more modules of the processor 604 by an RF signal bearing medium, where the signal bearing media 802 is conveyed by the wireless communications media 810 (e.g., a wireless communications medium conforming with the IEEE 802.11 standard).

According to some examples, a method is provided to redirect data from an application sandbox to datacenters. The method may include executing an application in an application sandbox at a first device and establishing a network connection between a sandboxed data store in the application sandbox and a first datacenter at a first geographic location. The method may further include exchanging a first data between the application and the sandboxed data store and exchanging the first data between the sandboxed data store and the first datacenter via the network connection.

According to some embodiments, the sandboxed data store may include a file and/or a directory. The method may further include establishing another network connection between another sandboxed data store in the application sandbox and a second datacenter at a second geographic location, exchanging a second data between the application and the other sandboxed data store in the application sandbox, and exchanging the second data between the other sandboxed data store and the second datacenter at the second geographic location via the other network connection. The method may further include exchanging a second data between the application and another sandboxed data store isolated from all datacenters.

According to other embodiments, the method may further include executing another application in another application sandbox at the first device, exchanging a third data between the other application and another sandboxed data store in the other application sandbox, and isolating the other sandboxed data store in the other application sandbox from all datacenters. The method may further include updating the network connection to end at a third datacenter at a third geographic location and subsequently exchanging the first data between the sandboxed data store and the third datacenter via the network connection. The network connection may be established and/or updated using a sandbox data servicer module being executed on the first device and/or based on datacenter information provided by a geo-manager module. The datacenter information may be provided as an application programming interface (API) message, a JavaScript Object Notation (JSON) object, and/or an Extensible Markup Language (XML) object. The datacenter information and/or the first data exchanged via the network connection may be encrypted.

According to further embodiments, the method may further include exchanging the first data between the sandboxed data store and the first datacenter in a first session and maintaining a session continuity by subsequently exchanging the first data between the sandboxed data store and the third datacenter in the same first session. The geo-manager module may be located at the first datacenter, the second datacenter, the third datacenter, or a separate entity. The method may further include establishing and/or updating the network connection based on one or more parameters associated with the application and/or the first device. The parameter(s) may include a geographic location associated with the first device, a geographic location associated with the application, the first geographic location, and/or the third geographic location.

According to other examples, a device is provided to redirect data from an application sandbox to datacenters. The device may include a memory, a sandboxing module configured to provide an application sandbox and a sandboxed data store in the memory, and a processing module. The processing module may be configured to execute an application in the application sandbox and establish a network connection between the sandboxed data store and a first datacenter at a first geographic location. The processing module may be further configured to exchange a first data between the application and the sandboxed data store and exchange the first data between the sandboxed data store and the first datacenter via the network connection.

According to some embodiments, the sandboxed data store may include a file and/or a directory. The processing module may be further configured to establish another network connection between another sandboxed data store in the application sandbox and a second datacenter at a second geographic location, exchange a second data between the application and the other sandboxed data store in the application sandbox, and exchange the second data between the other sandboxed data store and the second datacenter at the second geographic location via the other network connection. The processing module may be further configured to exchange a second data between the application and another sandboxed data store isolated from all datacenters.

According to other embodiments, the processing module may be further configured to execute another application in another application sandbox, exchange a third data between the other application and another sandboxed data store in the other application sandbox, and isolate the other sandboxed data store in the other application sandbox from all datacenters. The processing module may be further configured to update the network connection to end at a third datacenter at a third geographic location and subsequently exchange the first data between the sandboxed data store and the third datacenter via the network connection. The processing module may be further configured to execute a sandbox data servicer module to establish and/or update the network connection. The processing module may be further configured to receive datacenter information provided by a geo-manager module and establish and/or update the network connection based on the datacenter information. The datacenter information may be received as an application programming interface (API) message, a JavaScript Object Notation (JSON) object, and/or an Extensible Markup Language (XML) object. The datacenter information and/or the first data exchanged via the network connection may be encrypted.

According to further embodiments, the processing module may be further configured to exchange the first data between the sandboxed data store and the first datacenter in a first session and maintain a session continuity by subsequently exchanging the first data between the sandboxed data store and the third datacenter in the same first session. The geo-manager module may be located at the first datacenter, the second datacenter, the third datacenter, or a separate entity. The processing module may be further configured to establish and/or update the network connection based on one or more parameters associated with the application and/or the first device. The parameter(s) may include a geographic location associated with the first device, a geographic location associated with the application, the first geographic location, and/or the third geographic location.

According to further examples, a method is provided for geo-spatial load balancing and data management across datacenters. The method may include receiving application information associated with an application being executed in a device sandbox, determining, based on the application information and geospatial information associated with multiple datacenters, a destination datacenter selected from the multiple datacenters, and updating the application based on the destination datacenter.

According to some embodiments, the method may further include receiving other application information associated with another application executing in another device sandbox, determining another destination datacenter selected from the multiple datacenters based on the other application information and the geospatial information, and updating the other application based on the other destination datacenter. Updating the application may include providing an update to a sandbox data servicer module associated with the application.

According to other embodiments, the method may further include providing the update as an application programming interface (API) message, a JavaScript Object Notation (JSON) object, and/or an Extensible Markup Language (XML) object. The method may further include encrypting the update and/or determining the destination datacenter based on one or more parameters associated with the application and/or a device executing the application. The parameter(s) may include a geographic location associated with the device, a geographic location associated with the application, and/or a geographic location associated with the destination datacenter.

According to yet further examples, a geo-manager module is provided to redirect data from application sandboxes to datacenters. The geo-manager module may include a memory configured to store geospatial information associated with multiple datacenters and a processing module. The processing module may be configured to receive application information associated with an application being executed in a device sandbox, determine, based on the application information and the geospatial information, a destination datacenter selected from the multiple datacenters, and provide an update for the application based on the destination datacenter.

According to some embodiments, the processing module may be configured to determine another destination datacenter selected from the multiple datacenters based on the application information and the geospatial information, and provide the update for the application based on the destination datacenter and the other destination datacenter. The processing module may be configured to provide the update to a sandbox data servicer module associated with the application. The processing module may further be configured to encrypt the update and/or provide the update as an application programming interface (API) message, a JavaScript Object Notation (JSON) object, and/or an Extensible Markup Language (XML) object.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components on associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As anon-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to redirect data from an application sandbox to datacenters, the method comprising:
executing an application in an application sandbox at a first device;
establishing a network connection between a sandboxed data store in the application sandbox and a first datacenter at a first geographic location;

exchanging a first data between the application and the sandboxed data store;
exchanging the first data between the sandboxed data store and the first datacenter via the network connection; and
exchanging a second data between the application and another sandboxed data store, wherein the other sandboxed data store is isolated from all datacenters.

2. The method of claim 1, further comprising:
establishing another network connection between another sandboxed data store in the application sandbox and a second datacenter at a second geographic location;
exchanging a second data between the application and the other sandboxed data store in the application sandbox; and
exchanging the second data between the other sandboxed data store and the second datacenter at the second geographic location via the other network connection.

3. The method of claim 1, further comprising:
executing another application in another application sandbox at the first device;
exchanging a third data between the other application and another sandboxed data store in the other application sandbox; and
isolating the other sandboxed data store in the other application sandbox from all datacenters.

4. The method of claim 1, further comprising:
updating the network connection to end at a third datacenter at a third geographic location; and
subsequently exchanging the first data between the sandboxed data store and the third datacenter via the network connection.

5. The method of claim 4, further comprising establishing and/or updating the network connection using a sandbox data servicer module being executed on the first device.

6. The method of claim 4, further comprising:
exchanging the first data between the sandboxed data store and the first datacenter in a first session; and
maintaining a session continuity by subsequently exchanging the first data between the sandboxed data store and the third datacenter in the same first session.

7. The method of claim 4, further comprising establishing and/or updating the network connection based on at least one parameter associated with an application and/or a first device.

8. The method of claim 7, wherein the at least one parameter includes a geographic location associated with the first device, a geographic location associated with the application, the first geographic location, and/or the third geographic location.

9. A device configured to redirect data from an application sandbox to datacenters, the device comprising:
a memory;
a sandboxing module configured to provide:
an application sandbox; and
a sandboxed data store in the memory; and
a processing module configured to:
execute an application in the application sandbox;
establish a network connection between the sandboxed data store and a first datacenter at a first geographic location;
exchange a first data between the application and the sandboxed data store;
exchange the first data between the sandboxed data store and the first datacenter via the network connection;
receive datacenter information provided by a geomanager module;
establish and/or update the network connection based on the datacenter information; and
encrypt one or more of the datacenter information and the first data exchanged via the network connection.

10. The device of claim 9, wherein the processing module is further configured to:
establish another network connection between another sandboxed data store in the application sandbox and a second datacenter at a second geographic location;
exchange a second data between the application and the other sandboxed data store in the application sandbox; and
exchange the second data between the other sandboxed data store and the second datacenter at the second geographic location via the other network connection.

11. The device of claim 9, wherein the processing module is further configured to:
execute another application in another application sandbox;
exchange a third data between the other application and another sandboxed data store in the other application sandbox; and
isolate the other sandboxed data store in the other sandbox from all datacenters.

12. The device of claim 9, wherein the processing module is further configured to:
update the network connection to end at a third datacenter at a third geographic location; and
subsequently exchange the first data between the sandboxed data store and the third datacenter via the network connection.

13. The device of claim 12, wherein the processing module is further configured to execute a sandbox data servicer module to establish and/or update the network connection.

14. The device of claim 12, wherein the processing module is further configured to:
exchange the first data between the sandboxed data store and the first datacenter in a first session; and
maintain a session continuity by subsequently exchanging the first data between the sandboxed data store and the third datacenter in the same first session.

15. The device of claim 12, wherein the processing module is further configured to establish and/or update the network connection based on at least one parameter associated with an application and/or a first device.

16. The device of claim 15, wherein the at least one parameter includes a geographic location associated with the first device, a geographic location associated with the application, the first geographic location, and/or the third geographic location.

17. A method for geo-spatial load balancing and data management across datacenters, comprising:
receiving application information associated with an application being executed in a device sandbox;
determining, based on the application information and geospatial information associated with a plurality of datacenters, a destination datacenter selected from the plurality of datacenters;
updating the application based on the destination datacenter, wherein updating the application includes providing an update to a sandbox data servicer module associated with the application; and
encrypting the update.

18. The method of claim 17, further comprising:
receiving other application information associated with another application executing in another device sandbox;
determining, based on the other application information and the geospatial information, another destination datacenter selected from the plurality of datacenters; and
updating the other application based on the other destination datacenter.

19. The method of claim 17, further comprising determining the destination datacenter based on at least one parameter associated with an application and/or a device executing the application.

20. The method of claim 19, wherein the at least one parameter includes a geographic location associated with the device, a geographic location associated with the application, and/or a geographic location associated with the destination datacenter.

* * * * *

UNITED STATES PATENT AND TRADEMARK OFFICE
CERTIFICATE OF CORRECTION

PATENT NO. : 9,531,813 B2  
APPLICATION NO. : 14/380372  
DATED : December 27, 2016  
INVENTOR(S) : Kruglick It is certified that error appears in the above-identified patent and that said Letters Patent is hereby corrected as shown below:

In the Specification

In Column 1, Line 8, delete "US.C. §371" and insert -- U.S.C. § 371 --, therefor.

In Column 6, Line 34, delete "JSON/XML, object," and insert -- JSON/XML object, --, therefor.

In Column 14, Line 38, delete "and or" and insert -- and/or --, therefor.

In Column 15, Line 39, delete "components on" and insert -- components so --, therefor.

In Column 16, Line 42, delete "anon-limiting" and insert -- a non-limiting --, therefor.

Signed and Sealed this  
Eleventh Day of April, 2017

Michelle K. Lee  
*Director of the United States Patent and Trademark Office*